June 2, 1959 G. L. GRANT ET AL 2,889,544

MECHANICAL MEMORY FOR FARE COLLECTING APPARATUS

Filed Jan. 29, 1957 2 Sheets-Sheet 1

Inventors
Gardner L. Grant
Frank P. Rosapepe
by Roberts, Cushman + Grover
Att'ys Inventors
Gardner L. Grant
Frank P. Rosapepe
by Roberts, Cushman & Grover
Att'ys United States Patent Office 2,889,544

Patented June 2, 1959

2,889,544

MECHANICAL MEMORY FOR FARE COLLECTING APPARATUS

Gardner L. Grant, Providence, and Frank P. Rosapepe, Cranston, R.I., assignors, by mesne assignments, to Grant Development Company, Providence, R.I., a corporation of Rhode Island Application January 29, 1957, Serial No. 637,019

11 Claims. (Cl. 340—213)

This invention relates to memory devices and more especially to a memory for fare and toll collection devices and/or systems.

It is desirable in certain collection devices and/or systems to dispense with an attendant and yet to have some way of determining whether the correct fare or toll has been paid and if it has to give one kind of signal, and if it has not, another kind of signal. Accordingly, the principal objects of this invention are to provide a memory device which may be associated with a fare or toll collection box in a collection system which will compare the amount of the fare actually deposited with the amount which should have been deposited, to provide a device for making such comparisons which will function for several different fares and/or several combinations of coins making up the same fare, and to provide a device for making such a comparison which, depending upon whether the comparison is favorable or unfavorable, will operate an appropriate signal and reset itself for the next deposit.

As herein illustrated the device has a pair of relatively movable elements carrying sensing means and means yieldingly holding the elements with the sensing means at a predetermined distance from each other, which distance represents the monetary value of the fare that should be deposited. There is means associated with the movable elements which, in response to the amount of the deposited fare moves the sensing means into registration, and other means operable by registration of said sensing means to operate a fare-paid signal and then restore the elements to their initial spacing for the next cycle of operation. The elements may carry several sensing means for different fares or for different compositions of the same fare. For taking into account fares of large denomination and fares which may comprise a combination of coins and tokens or just tokens, there is in combination with the movable elements circuitry which includes a stepping switch operable in conjunction with or independently of the memory.

The invention will now be described in greater detail with reference to the accompanying drawings wherein.

In the pending application of Harry B. Miller, Serial No. 216,703, filed March 21, 1951, now Patent No. 2,848,158, there is shown a power driven fare collection and registering apparatus which, as described therein, is adapted to receive coins according to their denomination and to register their totals on counters. The device has a main shaft which is rotated once for each cycle of operation of the machine. A coin gauge measures the diameter of each coin and is operable depending upon its displacement to clutch a wheel on the main shaft to it for rotation with the main shaft at different angular locations, so that the wheel may turn a different amount for each rotation of the shaft depending upon the denomination of the coin. Thus for a penny the wheel wil lturn only the distance between adjacent teeth. For a nickel it will turn a distance equal to five teeth and for a dime it will turn a distance equal to ten teeth. The wheel is in turn geared to the shaft of a counter carrying counter disks so that rotation of the wheel will rotate the lowest counter disk through one unit for each unit deposit. Separate counters are provided for quarters and tokens respectively, and their respective shafts are caused to turn one division for each quarter or token deposited by gears slidably mounted on the respective shafts. Displacement of the gauge by a quarter or token shifts one or the other of the slidable gears into engagement with a gear on the main shaft which has but one tooth.

Figure 1:
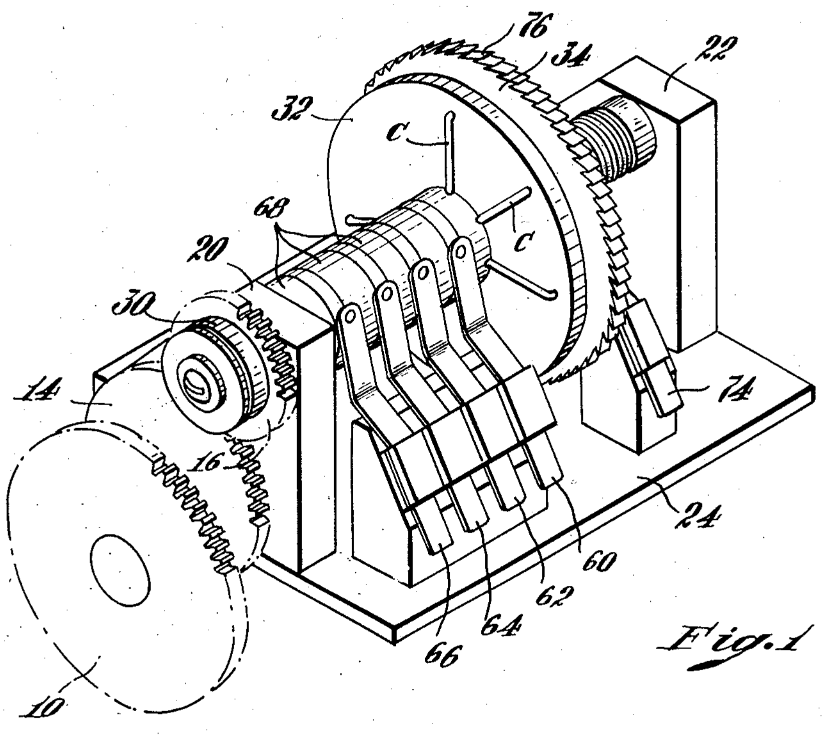
Fig. 1 is a perspective view of the memory device.

The memory device which forms the subject matter of the present invention is operably connected to the wheel on the main shaft of the aforesaid apparatus by means of gears 10, 12, 14 and 16 (Figs. 1 and 2) so that its main shaft 18 rotates 9° for each unit value of a dollar (1/100). The main shaft 18 is journaled for rotation between a pair of spaced, parallel end plates 20, 22, fastened to a base plate 24. The gear 16 is loose on the shaft 18 and is connected thereto by way of a slip clutch 30 which normally transmits rotation of the gear to the shaft, but which will slip if the shaft binds or is prevented from rotating so as not to damage or destroy the mechanism.

Mounted on the shaft 18 are two disks 32 and 34. The disk 32 has a hollow hub 36 which surrounds the shaft and is fixed thereto by a pin 38 so that the disk rotates with the shaft. The disk 34 has a hollow hub 40 which surrounds the shaft and is free to turn thereon. The hub 40 extends only part way to the end plate 22 and there is placed on the shaft between its end and the end plate a coiled spring 42, one end of which is fastened to the hub 40 and the other end of which is fastened to a collar 44 which in turn is fixed to the shaft by a pin 46.

On the opposed surfaces of the disks 32 and 34 there are blocks 48 and 50, each projecting from its face toward the other and each at a corresponding radial distance from the center which normally have interengaging contact, being held in contact by some initial tension in the spring 42. This position is the normal zero position of the disks with respect to each other, and it is apparent that this zero position is not limited to any particular angular position of the disks on the shafts.

Figure 3:
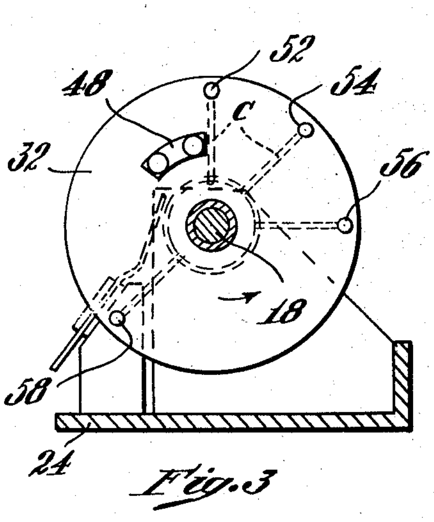
Fig. 3 is a vertical section taken on the line 3—3 of Fig. 2.
Figures 4, 5:
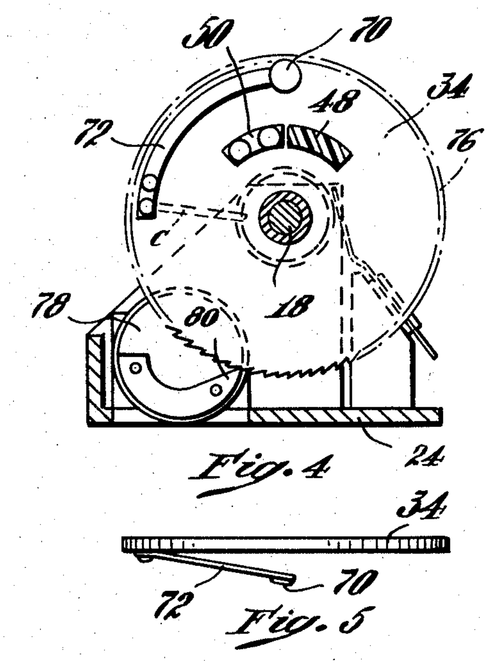
Fig. 4 is a vertical section taken on the line 4—4 of Fig. 2.
Fig. 5 is a plan view looking down on top of Fig. 4.

On the inner face of the disk 32 (Fig. 3) there are several contact members 52, 54, 56 and 58 (Figs. 3 and 4), located at different angular positions about the surface of the disk. The terminal 52 coincides with its stop 48, the terminal 54 lying at an angle of 45° therefrom, the terminal 56 lying at an angle of 90° therefrom, and the terminal 58 at an angle of 225° therefrom. Each contact has extending from it a conductor *c* which passes through the disk, then radially inwardly along the outer surface of the disk and finally along an axially extending groove in the surface of the hub 36. Mounted on the hub are four slip rings, having cooperating brushes 60, 62, 64 and 66 (Fig. 2), to which the conductors from the terminals 52, 54, 56 and 58 are respectively connected. The slip rings are held in spaced relation on the shaft by spacing collars 68.

Figure 2:
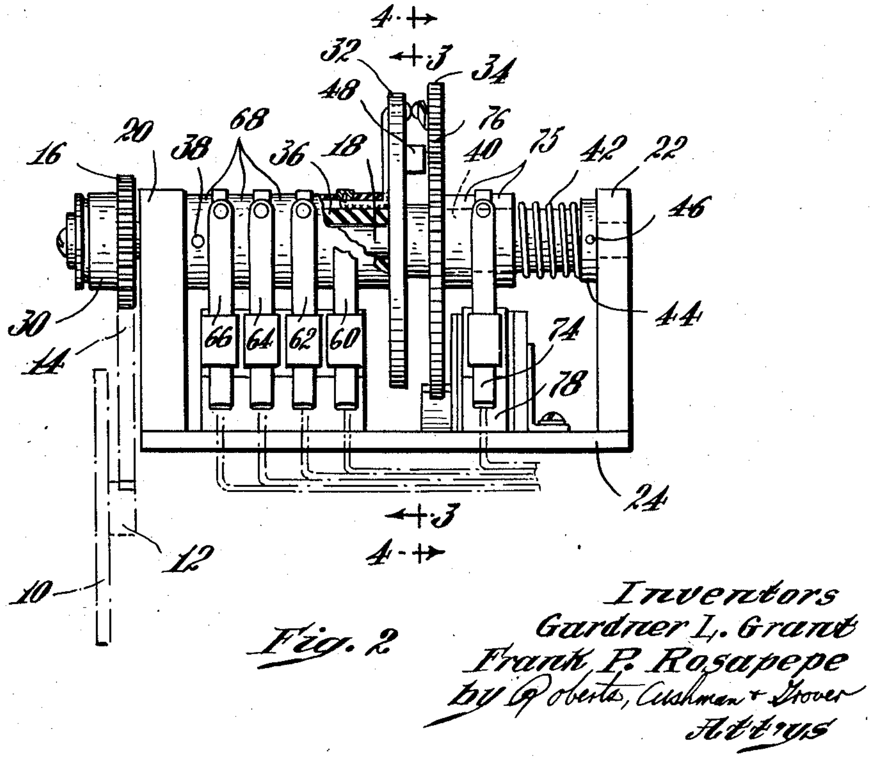
Fig. 2 is an elevation partly in section as seen from the front of Fig. 1.

On the inner face of the disk 34 (Fig. 4) there is a single contact 70 mounted on one end of a leaf spring 72 which is longitudinally arcuate so as to follow the perimeter of the disk, the opposite end of which is fastened to the disk 90° away from the one end so that the contact 70 lies on a radius passing through the end of its stop 50. The fastened end of the spring has connected to it a conductor c which first passes through the disk to the exterior thereof and then extends radially inward toward the hub and along a groove in its hub 40 to a slip ring and its brush 74 (Fig. 2). Spacers 75 on the hub retain the slip ring in its proper position.

The disks 32 and 34 are comprised of a non-conductive such as Bakelite and the contact 70 is held away from the disk 34 by the leaf spring 72 so that relative rotation of the disk, as will appear hereinafter, will result in movement of the terminal 70 from one contact to another on the disk 32, thereby to establish an electric circuit through the disks only when a contact is made between the contact 70 and one of the several contacts 52, 54, 56 and 58.

The perimeter of the disk 34 (Fig. 4) has on it teeth 76. On the base plate 24 adjacent to the disk 34 there is mounted a rotary solenoid 78 carrying a pawl 80 which normally yieldably engages the teeth 76 on the disk 34 so as to prevent rotation of the disk 34 as the shaft 18 is rotated through the intermediary of the spring 42. Consequently as the shaft 18 turns the spring 42 is wound up, therefore, storing up energy which, when released by retraction of the pawl 80 will turn the disk 34 in the same direction as the disk 32 was turned by the shaft until its stop comes into contact with the stop 48 of the disk 32 which was moved ahead of it by rotation of the shaft 18 while it was held against rotation by the pawl.

Figure 6:
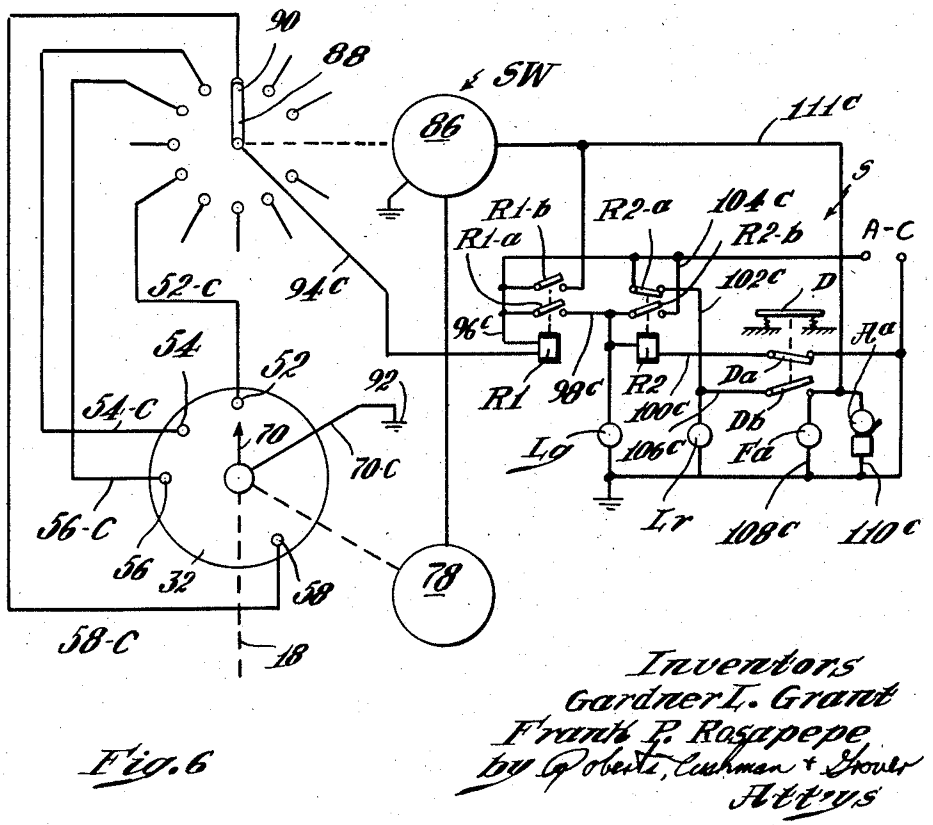
Fig. 6 is a wiring diagram of the memory and its associated parts.

The contacts 52, 54, 56 and 58 are provided herein for giving a fare-paid signal when a twenty-five cent fare is deposited in the form of cash, for example, two dimes and a nickel or five nickels, or a twenty-five cent piece, or a dime and a fifteen cent token or two tokens. To accomplish this the memory disks are placed in circuit with a stepping switch SW which includes a rotary solenoid 86 and rotor 88 with a terminal 90, a fare-paid signal circuit S including red and green lights Lr and Lg, the purpose of which is to indicate that the correct fare has been deposited or not, and flashing, and audible signal means Fa and Aa, and means for restoring the device to its zero setting after the fare-paid signal has been given, all of which is shown diagrammatically in Fig. 6. The several brushes 60, 62, 64, 66 and 74 are connected by conductors 52c, 54c, 56c, 58c and 70c, which enter a common plug, to the stepping switch rotor 88. In the wiring diagram the disk 34 is omitted except for the contact 70, which is shown therein in the form of an arrow.

When a circuit has been established through the disks 32, 34 to the rotor 88 an impulse will be sent through the conductor 94c to a relay R1 connected to the positive side of power lines A—C by a conductor 96c. The relay R1 has two contacts R1–a and R1–b, both of which are normally open. The contact R1–a when closed makes a circuit through a conductor 98c and a green light Lg to the negative line C. The contact R1–b when closed makes a circuit through the reset solenoids 78 and 86 to the ground. Closing of the contact R1–a also energizes a relay R2 which is connected on one side to the conductor 98c and at its other side to the negative line C by a conductor 100c. The relay R2 has a normally closed contact R2–a and a normally open contact R2–b. The normally closed contact R2–a is connected at one side to the positive line A and through a conductor 102c and a red light Lr to the negative line C. Thus the red light is normally on. The normally open contact R2–b is connected at one side by a conductor 104c to the positive line A and by way of the conductor 98c and the green light Lg to the negative side and when closed constitutes a holding circuit for the relay R2. A road switch D is placed in the lane ahead of the toll fare box, in the direction of departure from the box, over which the vehicle must pass as it leaves the fare box, and the switch has two contacts Da and Db, the former being normally closed and the latter normally open. The switch Da is in the conductor 100c so that when it is opened the relay R2 will be de-energized. The switch Db is connected at one side by a conductor 106c to the conductor 102c and at its other side to the negative line C by two conductors 108c and 110c in parallel. In the conductor 108c there is a flashing light Fa and in the conductor 110c there is an audible alarm Aa. As thus set up, since the contact R2–a is normally closed, the red light Lr is on and will remain on so long as no signal impulse is received from the fare-paid signal line 94c, thus indicating to an approaching motorist that he must stop. On receipt of an impulse, when the correct fare is paid, the relay R1 is energized which closes the contacts R1–a and R1–b. The closing of the contact R1–a completes the circuit through the relay R2 which opens the contact R2–a, thereby extinguishing the red light Lr, closes the contact R2–b, thereby energizing the green light Lg, and supplies energy to the plus side of the relay R2 to hold it energized. The closing of the contact R1–b also energizes the solenoids 78 and 86 so as to reset them. The green light Lg will now continue to burn until the vehicle runs over the detector switch D as it is leaving the station, whereupon the contact Da is opened, thereby interrupting the circuit through the relay R2, which extinguishes the green light Lg. Simultaneously the contact R2–a will be closed to re-energize the red light Lr. In the event that the motorist does not pay the toll fare or if he pays less than the correct amount of fare no signal impulse will be sent to the relay R1. Since the red light is on, the motorist is warned not to proceed, however, should he proceed in spite of the red light, when he passes over the road switch D he will close the normally open switch Db, thereby closing the circuit through the visible alarm Fa and audible alarm Aa, which will respectively, flash a red light and sound a gong. If as pointed out above the wrong fare is deposited no signal will be given, however, the memory disk 32 will be turned an amount corresponding to the value of the deposit. If the motorist is apprehended before he gets away a deposit of the balance of the fare will cause the meter to register the correct amount of toll and the circuit will operate as described above. If he succeeds in getting away without paying the balance, the memory is reset, as the switch Db closes, by way of a conductor 111c which extends from the switch contact to the solenoid 86.

If twenty-five cents in cash, other than a twenty-five cent piece is deposited in the collection apparatus the shaft 18 will be turned through 225°, which will turn the the disk 32 through 225°, moving the contact 58 into line with the spring contact 70 on the disk 34. When the terminals 58 and 70 are aligned a circuit is completed through the disks from the ground 92 by way of conductor 58c, rotor 88 and stepping switch contact 90, to conductor 94c and from thence to the fare-paid signal circuit S. The fare-paid signal circuit S, as stated above, has red and green lights, the red light normally burning so as to indicate to the motorist that he must stop for payment of the toll fare. Upon deposit of the correct twenty-five cent fare the impulse produced by registration of the disks extinguishes the red light and energizes the green light so as to indicate the correct fare has been paid. An overpayment will also give a fare-paid signal. If less than the required fare is paid no impulse will be sent to the signal device and as related above the red light will continue to burn. As indicated above, however, when the motorist departs from the station he passes over the switch D which actuates the visible alarm Fa in the form of a flashing light and the audible alarm

*Aa* in the form of a gong so as to forcibly bring to the attention of the person who made the deposit that he is in error.

When a twenty-five cent piece is deposited, because of the mechanical set up of the coin machine, as previously explained, the shaft 18 will rotate only 45°. This brings the contact 54 into alignment with the spring terminal 70 so that a current passage is completed from the ground 92 through the disks and the conductor **54*c* up to the stepping rotor 88. To complete the circuit through the stepping rotor, however, the stepping switch solenoid 86 must be operated to turn the contact 90 so as to bring the rotor 88 thereon beneath the end of the conductor 54*c*. This is accomplished by the coin machine itself which, as previously explained, is provided with a gauge mechanism which recognizes a quarter by its diameter and sends a signal to the stepping switch solenoid 86 to turn the contact 90 through one notch. Completion of the circuit through the rotor to conductor 94*c* gives the fare-paid signal by changing the red light to green and energizes the solenoids 78 and 86 so as to reset both the disk 34 and the contact 90**.

If a dime and token are deposited the dime will cause the disk 32 to turn through 90°, at which point the contact 56 will engage the contact 70. A circuit is thus established from the ground 92 through the disks and the conductor **56*c* up to the stepping switch rotor 88. The contact 90 on the rotor, however, is two notches away from the end of the conductor 56*c*. The collection device, however, is mechanically set up to recognize a token, as previously pointed out, by its gauging means and sends a signal to the stepping switch solenoid 86 to move its contact 90 through two notches, thus to bring the contact 90 on the rotor beneath the end of the conductor 56*c*. This completes the circuit through the rotor to the conductor 94*c*** and to the fare-paid signal, as previously explained, to change it from red to green. This is, of course, accompanied by reset impulses which return the respective parts to their zero position.

If two tokens are deposited the collection apparatus fails to impart motion to the gearing of the memory so that the disks 32 and 34 remain stationary. The collection apparatus itself, however, sends an impulse to the stepping switch solenoid 86 so as to cause it to move the contact 90 two notches per token or a total of four notches to bring the contact 90 on the rotor beneath the end of the conductor **52*c*. Thus a completed circuit is established from the ground 92 through the disks, conductor 52*c*, contact 90, rotor 88 and conductor 94*c* to the fare-paid signal device S. Again, as previously explained, each time the fare-paid signal is given reset impulses are sent to the reset solenoids 78 and 86 so as to return both the disk 32 and the rotor 88** to their normal starting positions.

While the device is specifically set up to give a fare-paid signal when a fare having a total value of twenty-five cents is deposited it is, of course, obvious that it may be set up for a fare of any desired amount, or for several different fares. For example, it could be set up so that the several contacts represent some other fare or with a single contact representing a fare of five, ten, fifteen or twenty cents and as the disk 34 is rotated by deposit of such a fare engagement of the contact 70 with one of the contacts on the disk 32 will establish a circuit through the disk to operate a fare-paid signal or alarm showing the correct fare has not been paid.

It should be understood that the present disclosure is for the purpose of illustration only and that this invention includes all modifications and equivalents which fall within the scope of the appended claims.

We claim:

1. A memory device for comparing the cash fare deposited with the required cash deposit, comprising a pair of movable elements carrying sensing means, means yieldably holding said elements with the sensing means at an initial predetermined distance from each other, means for effecting relative movement of the elements, said means being controlled by a deposit of cash in an amount corresponding to that required, to bring the sensing means into registration, a signal device, and means operable by registration of the sensing means to operate said signal and to effect a return of said elements and sensing means to their initial predetermined position.

2. In a toll fare collection system, a memory device for comparing the fare deposited therein with the required fare, comprising a pair of opposed rotatable elements carrying means which in registration will transmit an impulse, means yieldably holding said means offset at a predetermined distance from each other, means controlled by the deposit of a fare corresponding to that required to effect relative movement of the elements to bring the means carried thereby into registration to effect transmission of said impulse, a signal device operable by said impulse to give a fare-paid signal, and other means operable by said impulse to restore said elements and means to their initial predetermined position.

3. In a toll fare collection system, a memory device for comparing the cash fare deposited with the required amount of fare, comprising a pair of spaced parallel disks mounted for relative rotation, said disks carrying contacts which, when engaged transmit a current impulse, means controlled by the deposit of a fare corresponding to that required to effect relative rotation of the disks to bring the contacts into engagement, a signal device operable by the current impulse to indicate the correct fare paid, and means operable by said current impulse to restore the elements and contacts to their initial predetermined spacing.

4. In a toll fare collection system, a memory device for comparing the cash fare deposited with the required fare, comprising a shaft mounting a pair of disks, one of which is fixed thereto and the other loose, a pair of contacts carried by the disks, means yieldably holding the disks and their contacts at a predetermined angular spacing, said yieldable means tending to restore the disks to said predetermined angular spacing when displaced from said predetermined angular spacing, latch means operably engaged with the loose disk constraining movement of said disk, means for turning the shaft and hence the disk fixed thereto, to bring the contacts together, a signal and means operable by registration of the contacts to operate the signal and release the latch means, whereupon said loose disk returns to its predetermined spacing with respect to the disk fixed to the shaft.

5. In a toll fare collection system, a memory device for comparing the deposited fare with the required fare, comprising a pair of spaced parallel disks mounted on a common shaft, one of said disks being fixed to the shaft for rotation therewith, and the other being loose on the shaft, a pair of contacts carried by the disks, means holding the disks with their contacts at predetermined angular positions with respect to each other, which distance represents the monetary value of the required fare, means carried by the shaft tending to turn the loose disk with the disk fixed to the shaft when the latter is rotated, means latching the loose disk at its initial position relative to the disk fixed to the shaft in opposition to said means tending to turn it, means controlled by the monetary value of the fare actually deposited to effect rotation of the shaft and hence the disk fixed thereto, relative to the latched loose disk, a signal device, and means operable by registration of the contacts to operate said signal and release the latch so as to return said disks to their initial positions.

6. In a toll fare collection system, a memory device for comparing the fare deposited with the required fare, comprising a main shaft, a pair of spaced parallel disks mounted on the shaft, one of the disks being fixed to the shaft for rotation therewith and the other being loose, a pair of contacts carried by the disks, interengageable stops carried by the opposed sides of the disks which cooperate to establish a predetermined angular spacing between the contacts, which angular distance represents the monetary value of the required fare, a coiled spring mounted on the shaft, said spring being fixed at one end of the shaft and at its other end to the rotatable disk, said spring operating yieldably to hold the disks at said predetermined angular spacing and yieldably opposing displacement thereof, a latch operably engaged with the loose disk normally holding it fixed with reference to the shaft, means controlled by the monetary value of the fare actually deposited to effect rotation of the shaft and hence the disk fixed thereto relative to the latched loose disk, a signal device and means operable by registration of said contacts to operate the signal and release the latch.

7. In a toll fare collection system, a memory device for comparing the actual fare deposited with the required fare, comprising a main shaft, a pair of spaced parallel disks mounted on said shaft, one of said disks being fixed to the shaft for rotation therewith and the other being loose, a pair of contacts carried by the disks, interengageable stops carried by the opposed sides of the disks which cooperate to establish a predetermined angular spacing between the contacts, a coiled spring on the shaft connected at its opposite ends to the shaft and the loose disk respectively, said spring operating to hold the disks at said spacing and yieldably opposing displacement, a solenoid operated latch engaged with the loose disk normally holding it fixed with reference to the shaft, means controlled by the monetary value of the fare actually deposited to effect rotation of the shaft and hence the disk fixed to it relative to the latched disk to bring the contacts into registration and to tension the spring, and a normally open circuit containing said contacts, and a signal in the circuit, said circuit being operable when closed by registration of the contacts to send an impulse to the signal and to the latch solenoid to change the signal and release the latch.

8. A memory device comprising a pair of relatively rotatable disks, one of which carries a single contact and the other several peripherally spaced contacts, a stepping switch having a rotor carrying a contact, a signal device, a conductor leading from the rotor to the signal device, conductors extending from the several spaced contacts on said other disk to the rotor, one of which has contact with the contact on the rotor, the others being spaced therefrom by one or more steps of the rotor, means controlled by the cash deposit to turn the disks relative to each other to bring one of said several contacts into engagement with said single contact, thereby to establish a completed circuit through the disks and rotor to the conductor to send an impulse to the signal, said means being operable by other than a cash deposit to turn the disks relative to each other to bring one of the other of said several spaced contacts into engagement with said single contact, and simultaneously to effect operation of the stepping switch to turn the rotor through the required number of steps to move the contact thereon into contact with the conductor extending from the one of the several contacts on said other disk which is engaged with the single contact on the one disk to establish a completed circuit through the disks and rotor to the conductor leading to the signal.

9. A memory device according to claim 8, wherein there is means operable by transmission of an impulse to the signal device to reset the disks and stepping switch to their initial position.

10. A memory device for comparing the cash fare deposited with the required deposit, comprising movable elements carrying means which when brought into registration will initiate an impulse, said elements being normally displaced by an amount corresponding to the required fare, means for effecting relative movement of the elements, said means being controlled by a deposit of cash in an amount corresponding to that required to bring them into registration but not otherwise, a signal device operable by the impulse to indicate the fare paid corresponds to that required, and other means operable by said impulse to return the elements to their initial position.

11. A memory device for comparing the cash fare deposited with the required deposit, comprising movable elements carrying means which when brought into registration will initiate an impulse, said elements being normally displaced by an amount corresponding to the required fare, means for effecting relative movement of the elements, said means being controlled by a deposit of cash of an amount corresponding to that required to bring them into registration but not otherwise, a normally red stop signal, said signal being operable by the impulse to change from red to green to indicate that the correct fare has been paid, and other means operable by said impulse to return the elements to their initial position and to reset the signal from green to red.

References Cited in the file of this patent

UNITED STATES PATENTS

| | | |
|---|---|---|
| 2,646,215 | Stovall | July 21, 1953 |
| 2,769,165 | Bower | Oct. 30, 1956 |